F. L. GOHL.
INKSTAND.
APPLICATION FILED JAN. 16, 1909.
979,473.
Patented Dec. 27, 1910.
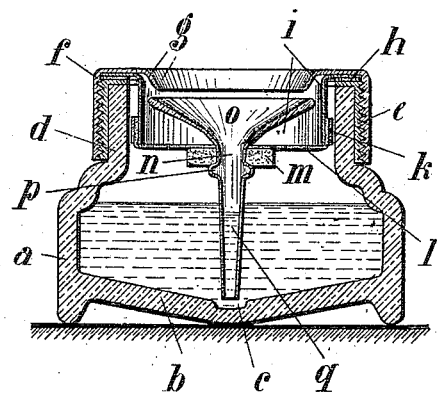
Witnesses:
Kenneth Romanes
Frank Simey
Inventor:
Friedrich Leo Gohl
by Paul D. Schilling
his attorney

UNITED STATES PATENT OFFICE.

FRIEDRICH LEO GOHL, OF ARLEN, NEAR SINGEN, GERMANY.

INKSTAND.

979,473.  Specification of Letters Patent.  Patented Dec. 27, 1910.

Application filed January 16, 1909. Serial No. 472,757.

*To all whom it may concern:*

Be it known that I, FRIEDRICH LEO GOHL, a subject of the Grand Duke of Baden, residing at Arlen, near Singen, Baden, German Empire, have invented certain new and useful Improvements in Inkstands, of which the following is a specification.

This invention contemplates the provision of an improved dust-tight fountain inkstand, with which the dip can be regulated at the will of the writer merely by pressure exerted by the pen, and with which any sediment that forms is prevented from coming in contact with the nib. The construction is also such that the ink-supply is prevented from evaporating and can be wholly utilized, while the danger of the ink running out, should the inkstand be accidentally overturned, is entirely obviated.

The invention is illustrated in the accompanying drawing, in which the figure is a vertical section of one form of construction of the device.

The new inkstand consists of an ink-reservoir $a$, which also serves, as ordinarily, as support for the entire device. The base $b$ of the reservoir $a$ is dished, so as to incline toward the center, where there is a small well $c$. The reservoir $a$ is provided with a cover $f$, shown in the drawing as being an internally threaded cap having a conically walled pen-hole $g$ and screwed to a ring $e$, cemented to the reservoir neck $d$. Held between the cover $f$ and ring $e$ there is a flanged tubular partition $i$, $h$ being a gasket of soft india-rubber or the like. Stretched across the bottom of the partition there is a perforated elastic diaphragm $l$, for instance of soft rubber, held by a clamping-ring $k$. The central portion of the diaphragm is strengthened, for example by a rubber reinforce-ring $m$, and through the aperture there is inserted a glass, vulcanite, or similar funnel $n$, which is retained in place by means of the flared cup portion $o$ and an annular swell $p$. The spout $q$ tapers slightly and descends almost to the well $c$, so as to enable practically the entire ink supply to be used up. The walls of the funnel-cup extend toward the walls of the pen-hole $g$ at approximately the same angle.

To use the inkstand, the practically dust and air-tight cover $f$ is screwed off and after sufficient ink has been supplied to the reservoir the cover is again replaced. The pen is then dipped into the funnel mouth $o$ and a slight pressure is exerted upon the wall of the latter with the nib. This pressure will cause the ink, which normally only stands at a certain level in the spout $q$, to rise in the latter and overflow into the mouth $o$ to a depth depending upon the extent of pressure exerted by means of the nib. In this manner the depth of dip is regulable at will, that is to say the nib can be wetted with ink to any desired degree. On removal of the pen, that is to say, on cessation of the pressure on the wall of the mouth $o$, the ink which has welled up will descend the spout $q$ again. The spout $q$ is narrow, so that the surface of ink exposed to the air is of extremely limited area. Evaporation or thickening of the ink is thus restricted to a minimum, even when the inkstand is out of use.

Owing to the conical dishing of the bottom $b$ and to the central well $c$, the quantity of ink supplied to the reservoir can be used practically to the last drop.

Having thus described my invention, I declare that what I claim as new and desire to secure by Letters Patent is—

1. An inkstand comprising an ink reservoir, a vertically disposed tubular portion having an outwardly extending flange which seats on the upper end of the reservoir, said tubular portion being spaced from the adjacent walls of the reservoir, a centrally perforated elastic diaphragm stretched across the bottom end of said tubular portion and having its bounding edges turned upwardly to engage with the outer sides of the tubular portion, a clamping ring engaged over said upwardly turned portions of the diaphragm to hold the latter rigidly to the tubular portion, a cover having a part seating on the outwardly extending flange of the tubular portion and formed with a conical shaped wall which extends beyond the inner face of the tubular portion and below the upper end of the latter, and a dip cup supported by said diaphragm and having a tubular extension which projects through the perforation thereof.

2. An inkstand embodying an ink reservoir, a vertically arranged tubular portion spaced from the adjacent walls of the reservoir, means for supporting the tubular portion on the interior of the reservoir, a centrally perforated elastic diaphragm stretched across the lower end of the tubular portion, a clamping ring to hold the diaphragm in engagement with the tubular portion, said diaphragm having a normal horizontal disposition, and a dip cup supported by the diaphragm and having a tubular extension which projects through the aperture thereof.

In testimony whereof I affix my signature in presence of two witnesses.

FRIEDRICH LEO GOHL.

Witnesses:
CARL W. SCHMITT,
JOSEPH ROHMER.